Patented Jan. 29, 1924.

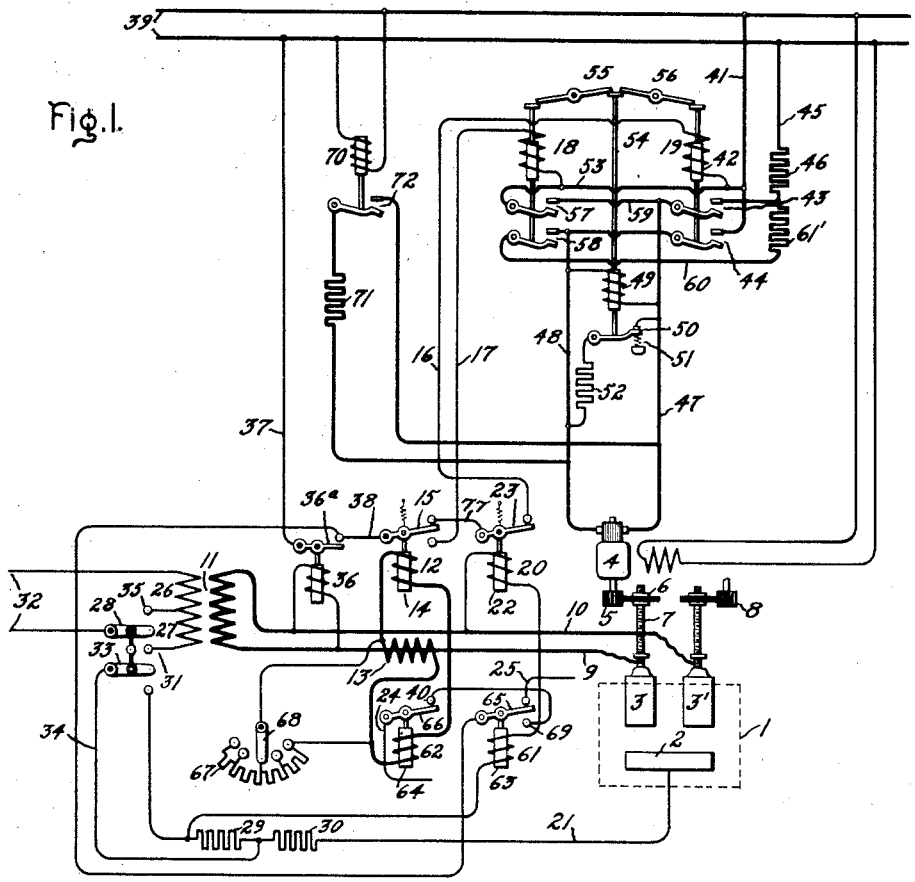

1,481,837

UNITED STATES PATENT OFFICE.

HAMMOND CHARLES HASTINGS AND NEWTON LAYCOCK, OF RUGBY, ENGLAND, ASSIGNORS TO GENERAL ELECTRIC COMPANY, A CORPORATION OF NEW YORK.

ELECTRIC-FURNACE CONTROL APPARATUS.

Application filed April 19, 1920. Serial No. 374,916.

*To all whom it may concern:*

Be it known that we, HAMMOND CHARLES HASTINGS and NEWTON LAYCOCK, subjects of the King of Great Britain, residing at Rugby, in the county of Warwickshire, England, have invented certain new and useful Improvements in Electric-Furnace Control Apparatus, of which the following is a specification.

The invention relates to the automatic control of arc furnaces to which power is supplied from single phase or 2 phase 4 wire circuits and in which there are two arcs in series in each phase.

A form of control for such furnaces is described in the patent to Alvin D. Keene, No. 1,255,613, dated February 5, 1918, one of the arcs being controlled by the current in the arc, and the second arc being controlled by its arc voltage.

Such a system will not satisfactorily deal with all the conditions which occur during the early stages of melting a rough charge in a steel furnace especially where the furnace electrodes are suspended by wire ropes.

For example:—If the arc is ruptured and the distance to be travelled by the current controlled electrode before it makes contact with the charge is less than that to be travelled by the voltage controlled electrode, the current controlled electrode motor will continue to rotate in the direction to lower after the electrode has made contact with the bath and produce slack rope so that when later the voltage controlled electrode makes contact and current passes, the current controlled electrode is not raised at once in order to strike an arc and reduce the current. The result is that a heavy overload current may persist while the motor is rotating to tighten the slack rope. Also if the charge suddenly fall into the current controlled arc causing the current to suddenly rise to a high value it may happen that the voltage controlled electrode will be fed down and tend to still further increase the current, whereas it is desirable that the current should be reduced as quickly as possible.

The object of the present invention is to overcome these undesirable features.

In the accompanying drawings, Fig. 1 is a very simplified diagrammatic representation of an electric furnace control system in accordance with the invention, and Fig. 2 is a very simplified diagram of a detail modification of the arrangement of Fig. 1.

Referring to Fig. 1 the furnace is diagrammatically illustrated by the rectangle 1 shown in dotted outline and comprises a stationary conductor or electrode 2 at the base of the furnace and movable electrodes 3, $3^1$, adapted to support arcs in series in conjunction with the stationary electrode 2. These electrodes may either all consist of a carbon or graphite or in some cases the conductor 2 may be a charge of metal or other conductive material in the furnace. A motor 4 is mechanically connected to the electrode 3 by any form of suitable gearing, the drawing showing a speed reducing gear 5 driven by the motor acting on the nut 6 on the screw threaded rod 7 to raise and lower the electrode. The motor connected to the electrode $3^1$ has not been shown. The electrode is shown as connected to a gearing 8 and it is to be understood that this gearing is connected to a motor and its control apparatus similar to the motor and control apparatus shown in connection with electrode 3.

The electrodes 3 and $3^1$ are connected respectively to electric mains 9 and 10 receiving electric energy from the secondary of a transformer 11.

The relay magnets 12 and 62 are connected to the secondary of a current transformer 13, the primary of which is constituted by a portion of the conductor 9. In parallel with the secondary of the current transformer is a non-inductive resistance 67 which is adjustable by means of the contact arm 68. The arrangement is such that although the relay 12 is set so as to always operate at a particular value of current in its coil, the current in the primary of the transformer corresponding to this current will differ according to the position of the contact arm 68.

The armature 14 of the relay 12 is connected to a lever 15 operating to make contact with either conductors 77 or 17 to complete a separate circuit and thereby to energize either of the solenoid operated contactors 18 or 19, as will be hereinafter described in greater detail. These contactors in turn control the armature circuit of the motor 4 to raise or lower the electrodes in order to maintain the current in an arc between the electrodes 3 and 2 substantially constant.

The windings of relays 20 and 61 are connected so as to be responsive to voltage variations of the arc operating between the electrodes 2 and $3^1$.

The armature 63 of the relay 61 is connected to a switch lever 65 adapted to make contact with either of the conductors 69 or 25. The contact 69 is connected through contact 40 of relay 62 to the conductor 24. Conductors 24 and 25 are connected to a set of contactors controlling the motor (not shown) for moving the electrode $3^1$.

The armature 22 of relay 20 is connected to switch lever 23, this lever being in the circuit of the operating coil of contactor 19, which contactor when closed causes electrode 3 to be lowered.

The relay 62 is controlled by the current in the arcs and its switch lever 66 is in the circuit of the operating coil of the contactor which when closed causes the electrode $3^1$ to be lowered.

For normal conditions the arc of electrode 3 is controlled by the curernt relay 12 and the arc of electrode $3^1$ by the voltage relay 61, and during these conditions relays 20 and 62 do not operate but remain in the position indicated in the diagram.

The relay 20 is set so that when the arc voltage of electrode $3^1$ exceeds the predetermined value which will be higher than that required to operate relay 61, the arm 23 is drawn down by the core 22 causing the circuit between 23 and wire 16 to be opened, thus preventing the lowering of electrode 3.

Relay 62 is set so that when the current in the arcs exceeds a predetermined value which is higher than that for which relay 12 is set, the core 64 will cause the circuit to be opened between the arm 66 and the contact 40, thus preventing the lowering of electrode $3^1$.

Examining now the system in greater detail, it will be noted that the primary winding of the transformer 11 is divided into two sections 26 and 27. By moving the switch 28 to either include or exclude the section 27 in the primary of the transformer the voltage of the energy supply may be changed. In circuit with the conductor 21 are two resistances 29 and 30. When the switch 28 is moved to make contact with the conductor 31, thus completing the circuit of the supply conductors 32, the switch 33 mechanically linked to the switch 28 completes a shunt circuit 34 about the resistance 29 and thus automatically sets the voltage relays 20 and 61 to operate at a lower range of voltage than is the case when the switch is moved to make contact with the tap 35 thereby cutting out the section 27 of the primary winding.

When the furnace is energized the relay 36 pulls up its armature and causes the switch lever $36^a$ to complete a circuit between the conductors 37 and 38. In case the energy supply is interrupted the relay 36 releases and opens the circuit to safeguard the apparatus against injury.

The armature of the current responsive magnet 12 is in position to complete a circuit for the conductors 39 which are preferably supplied with direct current to energize the contactor 19, the circuit being through the conductors 37, 38, the switch lever 15, switch lever 23, conductors 16 and 41. The contactor 19 closes contacts 43 and 44 and energizes the motor 4, causing it to rotate in a direction so as to lower electrode 3, the circuit being through the conductors 45, resistance 46, contact 43, conductor 47, the armature of the motor, conductor 48, contact 44, and the conductor 41. There is also a diverter circuit carrying main current around the armature of the motor from conductor 47, contacts 72 of contactor 70, resistance 71, back through conductor 48 to the armature. In the scheme as illustrated (Fig. 1), the contactor coil 70 is permanently energized, while the conductors 39 are energized so that the diverter circuit just described remains permanently closed, during automatic control.

As soon as contact is made between electrode 3 and stationary electrode 2, there will be practically double the normal arc volts between electrode $3^1$ and the stationary electrode 2 as no current is passing. Relay 20 will operate and prevent the current controlled electrode 3 from being lowered still further, thus preventing any tendency to produce slack rope in the suspension of electrode 3. The relay 61 will also operate causing $3^1$ to be lowered and make contact with stationary electrode 2.

When both electrodes 3 and $3^1$ make contact with stationary electrode 2, the electrodes are immediately raised again to strike the arcs. In the case of the current responsive relay 12 the lever 15 leaves the conductor 16 deenergizing the magnet 19 and opening the contacts 43 and 44. The counter-electromotive force of the motor 4 energizes a contactor magnet 49 connected across the conductors 47, 48, and by the closure of the contact 50 assisted by the spring 51, inserts a resistance 52 in the armature circuit to quickly bring the motor to rest by dynamic braking. While the motor circuit is closed through the resistance 52, a mechanical interlock 54 prevents the closure of the relay magnets 18 and 19 which are attached respectively to interlocks 55 and 56. Upon a flow of current the relay lever 15 completes a circuit through the magnet 18 through the conductors 77, 38, 17, 53, and 41. Before the magnet 18 may pull up its armature the motor must come to a stop and release the mechanical interlocks 54, 55—the same is true upon the reverse operation, the interlock 56 preventing closure of the contacts of the magnet 19 until the motor comes to a stop. When the motor is brought to rest the contactor 18 closes the contacts 57, 58, and energizes the motor to raise the electrode 3, the circuit being completed through the conductors 41, 53, contact 57, conductors 59, 47, the motor armature, conductor 48, contact 58, conductor 60, resistance 61' and 46 and the conductor 45. The diverter circuit through the resistance 71 also remains closed.

Having described the operation of the relay mechanism for the current relay 12, it will be understood without further detailed explanation how the voltage relay 61 operates to lower and raise the electrode $3^1$ so as to maintain an arc of predetermined length. The current of this second arc must necessarily be the same as the current of the arc between the electrodes 3 and 2 as the two arcs are electrically in series.

In the event of the charge suddenly falling into the arc of the current controlled electrode 3 causing an instantanous increase in current much higher than normal, the relay 62 would operate and would prevent $3^1$ from being lowered until the electrode 3 had been raised by the operation of its relay 12.

In some cases it will be desirable to raise both electrodes at higher than normal speed during the period when a high value of current is flowing owing to the falling in of the charge at both arcs.

Fig. 2 indicates a method of producing this result. In this diagram only the connections which differ from Fig. 1 are indicated. It is to be understood that where the connections are not shown they are the same as in Fig. 1. The same numbers are used in Fig. 2 and as in Fig. 1 to denote corresponding parts.

4 is the motor for electrode 3 and $4^a$ the motor for electrode $3^1$. 70 and $70^a$ are the contactors controlling the diverter resistances 71 and $71^a$ for these motors respectively. The current controlled relay 62 differs from that shown in Fig. 1 only in that it has two extra fixed contacts 73 and 74, and an additional conductor 75 is attached to the moving lever 66 and insulated from it. The diverter contactors are fitted with extra contacts 76 and $76^a$. These are connected in the operating coil circuits of the contactors 19 and $19^a$, which contactors when closed cause their respective electrodes to be lowered.

The operating coil of relay 62 is connected as in Fig. 1, the moving arm being in the position shown in Fig. 2 for normal operation. This relay is set so as not to operate while the current remains within the limits within which the relay 12 is intended to control it. For normal working conditions the diverter contactors 70 and $70^a$ remain in the position in which all contacts 72, $72^a$, 76, $76^a$ are closed. If excessive current flows due to the charge falling in on either electrode, relay 62 will operate, thus opening the two diverter contactors as the current for the operating coils for these normally passes through the contact 73, arm 75 and contact 74. The opening of the diverter contactors opens the main current diverter circuit for the motor armature through the resistances 71 and $71^a$. The motors will therefore run at higher than normal speeds when energized for raising the electrodes under these conditions.

The current being high relay 12 will make the circuit for raising electrode 3 and if the charge has fallen in so as to decrease the arc voltage at 31, the relay 61 will make the circuit for raising $3^1$.

When the raising of one or both electrodes in this way has caused the current to decrease to a predetermined value, the relay 62 will again operate to close the contacts 73, 74 and normal control at slow motor speeds will be resumed.

In accordance with the provisions of the patent statutes, we have described the principle of operation of our invention, together with the apparatus which we now consider to represent the best embodiment thereof; but we desire to have it understood that the apparatus shown in only illustrative, and that the invention can be carried out by other means.

What we claim as new and desire to secure by Letters Patent of the United States, is,—

1. A regulator for a plurality of cooperating arcing electrodes, comprising means for regulating the arcing relation of one of the electrodes in response to the current in the arc circuit and another of the electrodes in response to the voltage drop across the arc, and means for preventing the voltage controlled electrode from being lowered when the current in the arc circuit is abnormally high.

2. A regulator for a plurality of cooperating arcing electrodes, comprising means for regulating the arcing relation of one of the electrodes in response to the current in the arc circuit and another of the electrodes in response to the voltage drop across the arc, and means for preventing the current controlled electrode from being lowered when the arc voltage is abnormally high.

3. A regulator for a plurality of arcing electrodes connected in series relation, comprising means for regulating the arcing relation of one of the electrodes in response to the current in the arc circuit and another of the electrodes in response to the voltage drop across the arc, and means for preventing the voltage controlled electrode from being lowered when the current in the arc circuit is abnormally high and the current controlled electrode from being lowered when the arc voltage is abnormally high.

4. A regulator for a plurality of arcing electrodes connected in series relation, comprising means for regulating the arcing relation of one of the electrodes in response to the current in the arc circuit and another of the electrodes in response to the voltage drop across the arc, means for preventing the voltage controlled electrode from being lowered when the current in the arc circuit is abnormally high, and means for preventing the current controlled electrode from being lowered when the arc voltage is abnormally high.

5. A regulator for a plurality of arcing electrodes, comprising means for raising and lowering one of the electrodes in response to the current in the arc circuit and another of the electrodes in response to the voltage drop across the arc, and means for causing the electrodes to be raised at a higher speed than the normal when the current in the arc circuit is above a predetermined value.

In witness whereof, we have hereunto set our hands this nineteenth day of March, 1920.

HAMMOND CHARLES HASTINGS
NEWTON LAYCOCK.

Witnesses:
JOHN HALFORD,
J. A. FOSTER.